Figure 1:
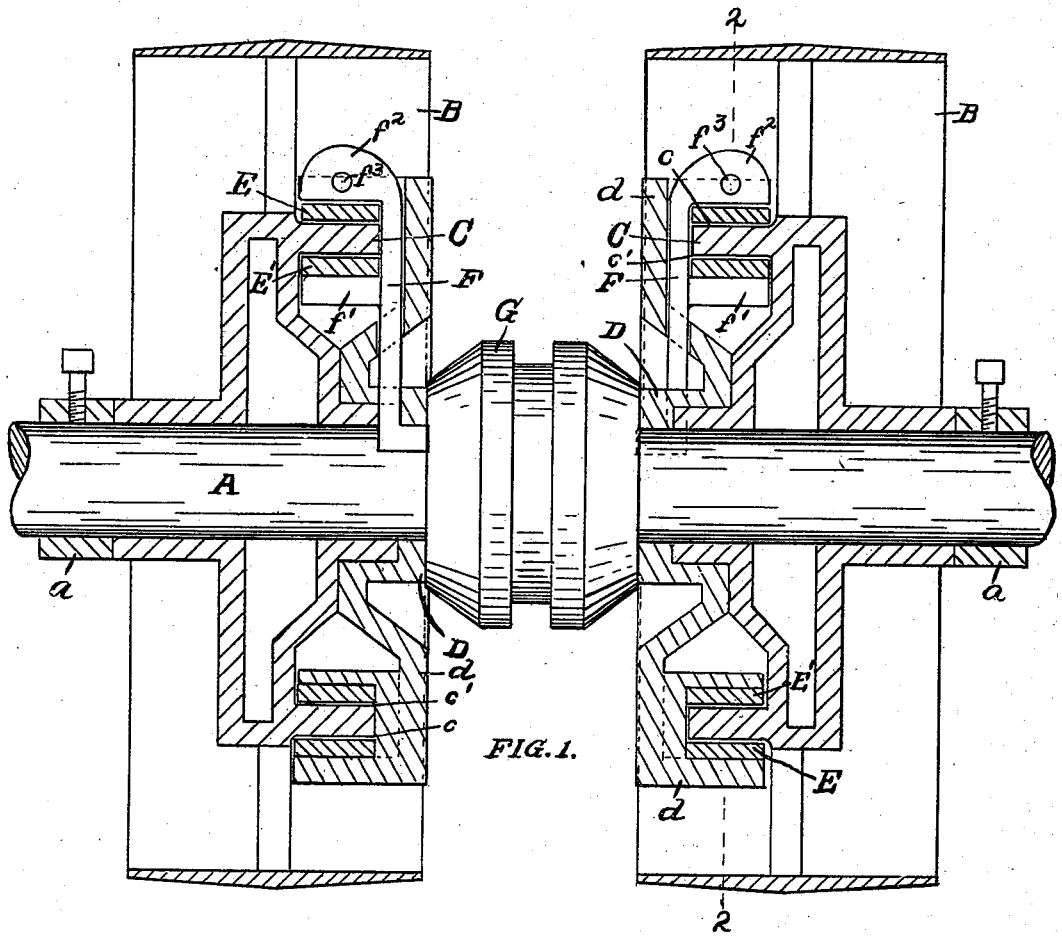

No. 726,646. PATENTED APR. 28, 1903.
M. R. CONWAY.
FRICTION CLUTCH.
APPLICATION FILED OCT. 6, 1902.
NO MODEL. 2 SHEETS—SHEET 2.
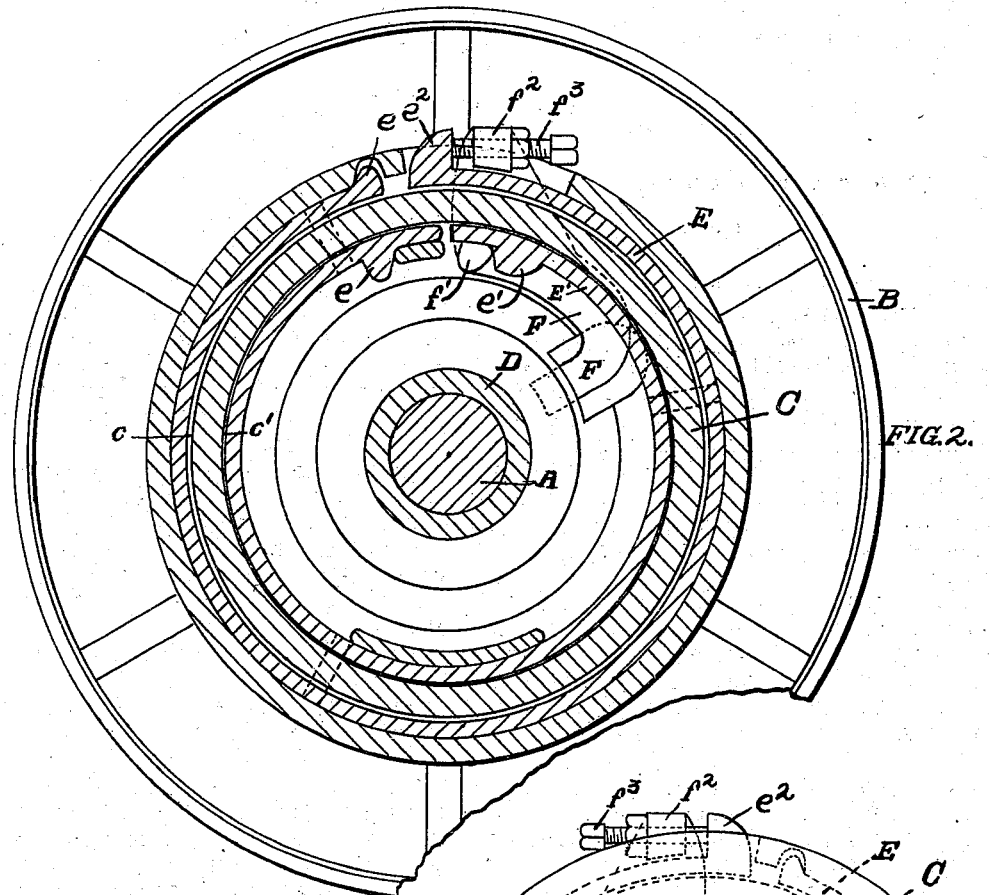
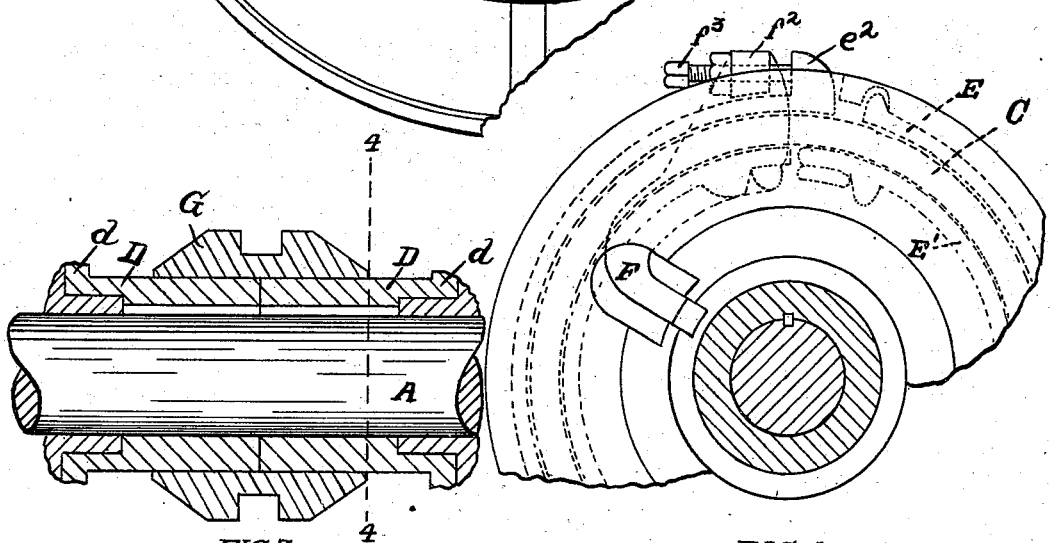
Witnesses
Alfred Oskamp
Evelyn Ash
Inventor
Michael R. Conway
By Attorneys
Parkinson + Richards

UNITED STATES PATENT OFFICE.

MICHAEL R. CONWAY, OF CINCINNATI, OHIO, ASSIGNOR TO THE KISINGER-ISON COMPANY, OF CINCINNATI, OHIO, A CORPORATION OF OHIO.

FRICTION-CLUTCH.

SPECIFICATION forming part of Letters Patent No. 726,646, dated April 28, 1903.

Application filed October 6, 1902. Serial No. 126,229. (No model.)

*To all whom it may concern:*

Be it known that I, MICHAEL R. CONWAY, a citizen of the United States, residing at Cincinnati, in the county of Hamilton and State of Ohio, have invented certain new and useful Improvements in Friction-Clutches, of which the following is a specification.

The object of my invention is to provide an improved friction-clutch; and the invention consists in the combinations and arrangements of parts hereinafter described and claimed.

In the drawings, Figure 1 is a sectional elevation of directly and reversely rotating pulleys equipped with clutches embodying my invention; Fig. 2, a section on line 2 2 of Fig. 1; Fig. 3, a longitudinal section of the cone-shifter, and Fig. 4 a section on line 4 4 of Fig. 3.

Reference-letter A denotes a driven shaft; B B, directly and reversely rotating pulleys rotatably mounted on shaft A; C, annular friction-flanges on pulleys B; D, driving-hubs attached to shaft A; E E', friction-straps engaging the outer and inner surfaces of flanges C; F, keys for applying straps E and E' to flanges C, and G a cone-shifter for operating keys F.

The shaft A and pulleys B are the usual shaft and pulleys for transmitting direct and reverse motion to any desired mechanism. Each of the pulleys B is provided with a centrally-located flange C, having external and internal friction-surfaces $c$ and $c'$, respectively. The hubs D may be of any desired construction, but are preferably provided with flanges $d$, covering flange C and straps E and E'. At one end each pair of friction-straps E and E' is provided with stops $e$, taking against corresponding stops $d'$ on flanges $d$. The stops $e$ have their active sides beveled, as shown. A key F is mounted between the free ends of straps E and E'. This key has a lug $f'$, bearing on lug $e'$ on the free end of strap E', and is provided with a lug $f^2$, carrying a set-screw $f^3$, bearing centrally against lug $e^2$ on the free end of strap E. The lengths of straps E and E' are such that they must be slightly sprung to fit in between their respective stops. This puts a slight spring in the straps, tending to hold them from contact with the friction-surface under normal conditions. The cone-shifter G is loosely mounted on hubs D and when shifted to one side or the other serves to operate keys F to force the friction-straps E and E' into contact with surfaces $c$ and $c'$. Collars $a$ serve to hold the pulleys in position.

In operation pulleys B are constantly rotated by belts in opposite directions. When it is desired to impart the rotations of one pulley to shaft A, the cone-shifter is shifted toward that pulley, causing the corresponding conical surface to engage the outer end of key F to rock the key in its bearings on straps E and E'. This rock of key F causes set-screw $f^3$ to press against lug $e^2$ on the end of strap E to apply it to surface $c$, and the reaction from set-screw $f^3$ is transmitted to the end of friction-strap E' through the bearing of key F therein, thus causing an end thrust on strap E' to expand it against surface $c'$. Since the action and reaction are always equal, the pressure applied to straps E and E' must be equal. It will be noted that the key F is thus mounted in what may be called a "floating" bearing, the effect of which is to automatically equalize the pressure of both straps E and E' on surfaces $c$ and $c'$. The pull on strap E and the end thrust on strap E' tend to cause the beveled surfaces of stops $e$ to travel on stops $d'$, thus forcing these ends of the straps into closer contact with their respective surfaces, and the natural effect of the rock of key F is to carry the free ends of the straps into closer contact with their respective surfaces, so that a uniform application of the straps throughout their entire lengths is obtained. By means of set-screw $f^3$ the straps may be properly adjusted to their surfaces and undue play due to wear taken up. When it is desired to remove shaft A from the domination of the pulley, the cone-shifter G is shifted back, thus permitting the key to resume its idle position and the straps to withdraw from contact with their surfaces, a result which is facilitated by a slight backward travel of straps $e$ on their beveled sides, tending to withdraw the straps at that end.

It will be noted that the application of the friction-pressure is radially and centrally of the pulley, thus obviating lateral or torsional strains on shaft A, and that the take up of wear by means of set-screw $f^3$ will maintain key F in a constant position.

While I have illustrated and described the preferred form of application, this is obviously capable of many variations without departing from the spirit of my invention. For instance, the friction-surfaces $c$ and $c'$ may be the external and internal surfaces of separate flanges instead of the same flange and the mounting of key F changed accordingly, or many other changes may be made in the form and details of construction. I therefore do not wish to be limited to the exact construction shown and described.

I claim as new and desire to secure by Letters Patent—

1. In a friction-clutch, the combination of external and internal concentric friction-surfaces; friction-straps adapted to contact with the surfaces; and means for applying a longitudinal pull to the end of the strap for the external surface and a longitudinal thrust to the end of the strap for the internal surface, substantially as specified.

2. In a friction-clutch, the combination of external and internal concentric friction-surfaces; friction-straps adapted to contact with the surfaces; a key mounted between the ends of the straps and having a bearing in each; and means for operating the key to apply a pull to the end of the externally-applied strap and a thrust to the end of the internally-applied strap, substantially as specified.

3. The combination in a friction-clutch of external and internal concentric friction-surfaces attached to one member of the clutch; friction-straps connected with the other member of the clutch and adapted to contact with the surfaces; a key mounted between the free ends of the straps with a bearing in each; and means for operating the key to apply a pull to the end of the externally-applied strap and a thrust to the end of the internally-applied strap, substantially as specified.

4. The combination in a friction-clutch of external and internal concentric friction-surfaces attached to one member of the clutch; friction-straps connected with the other member of the clutch and adapted to contact with the surfaces; a key mounted between the free ends of the straps with a bearing in each; and a cone-shifter for operating the key to apply a pull to the end of the externally-applied strap and a thrust to the end of the internally-applied strap, substantially as specified.

5. The combination in a friction-clutch of external and internal concentric friction-surfaces attached to one member of the clutch; friction-straps adapted to contact with the surfaces; beveled surfaces on the ends of the straps contacting with stops on the other member of the clutch; a key mounted between the free ends of the straps with a bearing in each; and means for operating the key to apply a pull to the end of the externally-applied strap and a thrust to the end of the internally-applied strap, substantially as specified.

6. In a friction-clutch, the combination of external and internal concentric friction-surfaces attached to one member of the clutch; friction-straps adapted to contact with the surfaces; beveled surfaces on the ends of the straps contacting with stops on the other member of the clutch; and means for applying a pull to the free end of the externally-applied strap and a thrust to the free end of the internally-applied strap, substantially as specified.

7. The combination in a friction-clutch of surfaces $c$ and $c'$; straps E and E' adapted to contact therewith; key F mounted between the straps, having a permanent bearing in the end of one and a set-screw connection with the end of the other; and cone-shifter G for operating key F, substantially as specified.

8. The combination in a friction-clutch of surfaces $c$ and $c'$ on pulley C; straps E and E' adapted to contact therewith and having their ends provided with beveled surfaces contacting with stops on flange $d$; key F mounted between the straps, having a permanent bearing in the free end of one and a set-screw connection with the free end of the other; and cone-shifter G for operating key F, substantially as specified.

MICHAEL R. CONWAY.

Witnesses:
ALFRED OSKAMP,
BRAYTON G. RICHARDS.